United States Patent [19]

Oetiker

[11] Patent Number: 5,537,721
[45] Date of Patent: Jul. 23, 1996

[54] TOLERANCE-COMPENSATING HOSE CLAMP

[75] Inventor: Hans Oetiker, Horgen, Switzerland

[73] Assignee: Hans Oetiker AG Maschinen- und Apparatefabrik, Switzerland

[21] Appl. No.: 293,183

[22] Filed: Aug. 19, 1994

[51] Int. Cl.⁶ .................................................. B65D 63/00
[52] U.S. Cl. .................. 24/20 R; 24/20 CW; 24/20 EE
[58] Field of Search ................ 24/20 R, 20 CW, 24/20 W, 20 TT, 20 EE, 20 S, 23 R, 23 EE

[56] References Cited

U.S. PATENT DOCUMENTS

| | | | |
|---|---|---|---|
| 1,705,895 | 3/1929 | Blair | 24/20 CW |
| 4,402,113 | 9/1983 | Smith | 24/20 R |
| 4,523,352 | 6/1985 | Wachter | 24/20 CW |
| 4,919,682 | 4/1990 | Bellazzi | 24/20 R |
| 4,991,266 | 2/1991 | Oetiker | 24/20 R |
| 5,208,949 | 5/1993 | Calmettes et al. | 24/20 R |
| 5,305,499 | 4/1994 | Oetiker | 24/20 CW |
| 5,353,478 | 10/1994 | Spors | 24/20 R |

*Primary Examiner*—Victor N. Sakran
*Attorney, Agent, or Firm*—Paul M. Craig, Jr.

[57] ABSTRACT

A clamp structure with a clamping band which can be used, for example, to fixedly secure a hose on a nipple and which includes a tightening arrangement for tightening the clamp structure about the object to be fastened by plastic deformation and a tolerance-compensating arrangement in the form of at least one undulation; the tolerance-compensating arrangement is thereby separate from the tightening arrangement providing the clamping forces and is so constructed and arranged that the tolerance-compensating arrangement does not affect the holding ability of the tightening arrangement but improves in combination with the tightening arrangement the return spring action of the clamp structure.

50 Claims, 1 Drawing Sheet

TOLERANCE-COMPENSATING HOSE CLAMP

FIELD OF THE INVENTION

The present invention relates to an open stepless hose clamp structure with a so-called "Oetiker" ear, made from band material and cut to proper length, which is capable to automatically compensate for tolerances in the assembly consisting of the hose-like part and of the object over which the hose-like part is to be fixedly mounted by the clamp structure.

BACKGROUND OF THE INVENTION

The problem of tolerance compensation in hose clamps has been recognized for some time, and various solutions have been proposed therefor. For example, U.S. Pat. No. 1,705,895 to Blair suggested zig-zag-shaped cutouts in the band to impart some elasticity to the band. Other configurations in the clamping band to impart some elasticity in the clamping band longitudinal direction are disclosed in U.S. Pat. No. 4,910,832 to Schaub and in German Patent DE 30 18 383 A to Rasmussen. One or more sections consisting of concavely shaped lateral band portions enclosing therebetween an hourglass-shaped opening in the clamping band to provide elasticity in the clamping band longitudinal direction were proposed in my own prior U.S. Pat. No. 4,987,651 relating to a so-called earless clamp. Additionally, similar sections of concavely shaped lateral band portions enclosing therebetween an hourglass-shaped opening were disclosed for hose clamps having one or more so-called "Oetiker" ears in my copending application Ser. No. 07/446,729, filed Dec. 6, 1989 and entitled "Improved Hose Clamp." Common to all of this type of prior art proposals is the fact that they involve cutouts in a planar clamping band so that the clamping band sections remain flat. Moreover, corrugations and undulations have already been proposed heretofore in the prior art to provide for tolerance compensation. For example, the British Patent 778,861 suggested one or more resilient, arcuately shaped compensating portions, also recognizing the problem of possible leakage as a result of the opening underneath these compensating portions. To avoid leakages, this patent also suggested that the arcuate compensating portions either be covered by an underlying end portion of the clamping band or be made of such size and curvature that the arcuate compensating portion will flatten out when the clamp is tightened so that the flattened clamping band then makes good contact with the hose. The French Patent 2,470,275 also suggested that the openings under the undulations either be covered by the underlying band portion or that these undulations be provided with special inwardly extending embossments to avoid leakages. Adopting the teachings of British Patent 1,064,048, mutually offset undulations on opposite sides of a central cut to minimize leakages as a result of the openings underneath the undulations were proposed in European Patent 0 296 918. Undulations in the clamping band can also be found in U.S. Pat. No. 4,308,648 and also in U.S. Pat. No. 4,919,682 which further suggests a longitudinal cut or slit to make the M-shaped clamp portion particularly elastic in the use of hoses or other articles made from hard material such as hard rubber. However, these prior art hose clamps, which were primarily concerned with imparting to the clamping band some elasticity in the longitudinal band direction did not make a clear distinction between tolerance compensation and the holding ability of the clamp as realized by a typical "Oetiker" ear nor were they concerned with the overall spring characteristics of the clamp to assure adequate spring action (spring return movement) to bring the clamp back to its size to assure a predetermined clamping force after the clamp has been expanded as a result of temperature and/or pressure changes of the medium carried by the hose and/or as required by aging of the hose material. All of the prior art clamp constructions failed to take into consideration these differing aspects and their interactions, and in particular failed to recognize the beneficial effects obtained by the combination of a typical "Oetiker" ear and of a tolerance-compensating arrangement with the use of an undulation.

SUMMARY OF THE INVENTION

The present invention differs from all of the aforementioned hose clamps in that adequate tolerance compensation and sufficient holding ability (clamping action) in the presence of changes in pressure and/or temperature of the medium carried by the hose as well as caused by aging of the hose is always assured by the combination of a tolerance-compensating means and of a so-called "Oetiker" ear consisting of outwardly extending leg portions interconnected by a bridging portion, preferably provided with reinforcing means which, after plastic deformation, provides the desired clamping action. Such an "Oetiker" ear, in combination with the tolerance-compensating means of this invention provides synergistic beneficial results as regards not only completely satisfactory compensation for all of these changes, but also as regards an improved spring action of the clamp structure to maintain the desired clamping force. The tolerance-compensating means in the form of an undulation can thereby be adapted in accordance with this invention to the particular hose-like materials for attaining the tolerance compensation as set forth in the customers' specifications with improved spring return movement and without affecting the function of the so-called "Oetiker" ear to maintain the specified clamping forces as determined by the original plastic deformation of the "Oetiker" ear to tighten the clamp.

In that connection, it has also been discovered that the tolerance-compensating means should take into consideration the material of the hose and more particularly its hardness to achieve optimum tolerance compensation and spring characteristics of the clamp structure, particularly as regards the amount of spring return movement. With relatively softer hose materials such as rubber, one or more parallel slots are preferably provided in the undulation which can extend in the clamping band even beyond the undulation. With relatively harder hose materials, it is preferable to provide only an opening in the center area of the top portion of the undulation which opening is preferably circularly shaped. In a preferred embodiment, the undulation is made with relatively small radii of curvature of the order of the thickness of the clamping band and has a height from the inner surface of the clamping band to the outer surface of its top which is about two to three times the thickness of the clamping band. The mechanical connection of the overlapping band portions includes one or more cold-deformed deep-drawn support hooks pressed out of the band material and a longitudinally extending tab-like hook also pressed out of the band material about an axis extending in the longitudinal direction of the clamping band. To avoid any leakage underneath the tolerance-compensating undulation, the opening underneath the same is covered by the underlying inner full-width clamping band end portion whereby the inner and outer clamping band end portions are provided with means to assure an inner clamping surface devoid of any step, offset or discontinuity.

BRIEF DESCRIPTION OF THE DRAWINGS

These and other objects, features and advantages of the present invention will become more apparent from the following description when taken in connection with the accompanying drawing which shows, for purposes of illustration only, two embodiments in accordance with the present invention and wherein.

DETAILED DESCRIPTION OF THE DRAWINGS

Figures 1, 2:
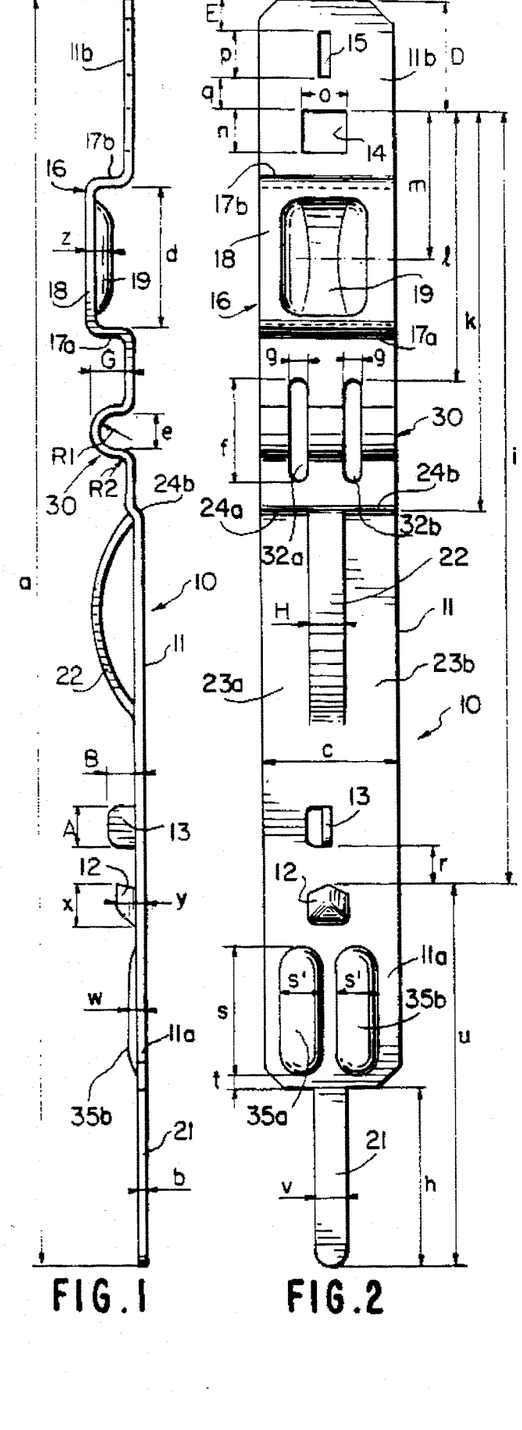
FIG. 1 is a side elevational view of a tolerance-compensating clamp with a so-called "Oetiker" ear in accordance with the present invention in the flat, punched-out condition.
FIG. 2 is a top plan view on the tolerance-compensating clamp of FIG. 1.
Figure 3:
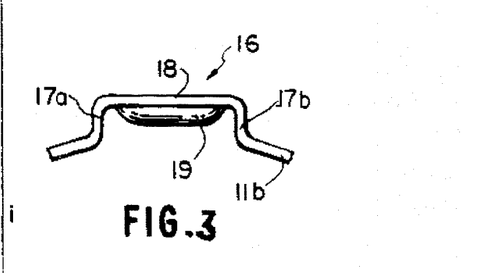
FIG. 3 is an enlarged view showing details of the "Oetiker" ear used in the tolerance-compensating clamp of this invention.
Figure 4:
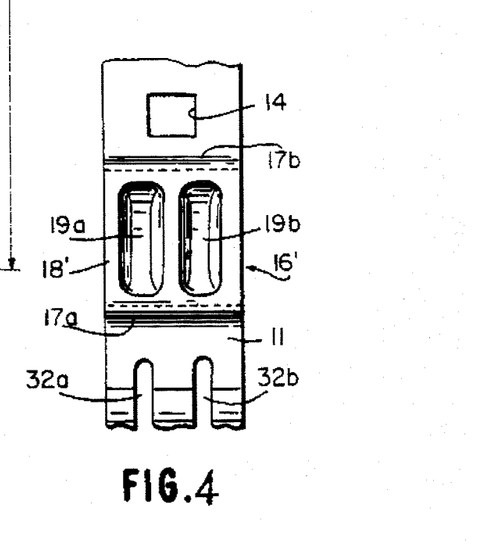
FIG. 4 is a partial top plan view, similar to FIG. 2, and showing a modified embodiment of a reinforced "Oetiker" ear for use in a clamp structure of this invention.

Referring now to the drawing wherein like reference numerals are used throughout the various views, and more particularly to FIGS. 1 and 2, reference numeral 11 designates a clamping band as used in the clamp structure of this invention. The clamp structure generally designated by reference numeral 10 is shown in flat condition as it exists after the punching and pressing-out operation. The inner end portion 11a and the outer end portion 11b of the clamping band 11 which overlap one another when the clamp is preassembled into its circular condition, are mechanically interconnected by any suitable means which, in the preferred embodiment, includes one or more deep-drawn, cold-deformed support hooks 12, as disclosed in my prior U.S. Pat. No. 4,299,012, and a tab-like, longitudinally extending hook 13 which is bent out of the clamping band about an axis extending in the longitudinal direction after an appropriately shaped cut. If the clamp structure is intended to be installed axially, the cut in the clamping band 11 is preferably U-shaped, and after preassembling the clamp structure 10 into circular shape by extending the tab-like member 13 into slot 15, the tab-like member 13 is preferably bent back upon itself to provide a fixed preassembly. However, if the clamp structure 10 is intended to be installed radially, it may also be advantageous to replace the tab-like member 13, shown in FIG. 1, with a combined guide and support hook as shown in my prior U.S. Pat. No. 4,622,720. The hooks 12 and 13 provided in the inner band portion 11a are thereby adapted to engage in a rectangular aperture 14 and in a longitudinally extending slot 15, respectively, provided in the outer band portion 11b within the area between the so-called "Oetiker" ear generally designated by reference numeral 16 and the free end of the outer end portion 11b. A so-called "Oetiker" ear 16 constitutes a tightening means for the clamp structure of this invention and includes two generally outwardly extending leg portions 17a and 17b interconnected by a bridging portion 18 which extends in the longitudinal direction of the clamping band. The bridging portion 18, which is substantially rectangular and is angularly disposed with respect to the leg portions 17a and 17b, is provided with reinforcing means 19 to enable proper plastic deformation thereof by means of a conventional pincer-like tool and to assure predetermined holding ability of the clamp structure by correct plastic deformation, as known for such "Oetiker" ears, which maintain predetermined holding forces, for example, in case of temperature and/or pressure changes of the medium carried by the hose or aging of the hose material. The reinforcing means 19 may be in the form of a V-shaped groove as shown in my prior U.S. Pat. No. 3,475,793 or preferably in the shape of a shallow depression of substantially rectangular configuration as shown in my prior U.S. Pat. No. 5,282,295 or in the shape disclosed in my copending application Ser. No. 07/629,716, filed Dec. 18, 1990 and entitled "Reinforced Ear Structure for Clamps," the subject matter of which is incorporated herein by reference. Moreover, in lieu of the single shallow depression 19, also two or more shallow reinforcing depressions 19a and 19b may be provided in the bridging portion 18' (FIG. 4) as long as the sum of the areas of these depressions meet the areas of the single depression as specified in the U.S. Pat. No. 5,282,295 or in the copending application Ser. No. 07/629,716, whereby each partial depression 19a and 19b is preferably constructed as disclosed in this last-mentioned U.S. patent or patent application. Once the mechanical connection is established by engagements of hooks 12 and 13 in apertures 14 and 15, the clamp now installed over the hose to be securely fixed, is then tightened by plastic deformation of the "Oetiker" ear into a more or less omega shape as is known in the art.

To assure an inner clamping surface of the clamp structure 10 which is devoid of any steps, offsets or discontinuities, means are provided at the inner and outer band portions 11a and 11b to eliminate any step at the free end of the overlapped inner band portion 11a. These means include a tongue-like extension 21 at the inner band portion 11a adapted to engage in a centrally located pressed-out band portion 22 in the outer band portion 11b forming a tongue-receiving channel leaving on both sides thereof lateral band portions 23a and 23b which merge into the diameter of the outer band portion at first step-like portions 24a and 24b while the channel-shaped recess 22 passes over into the normal diametric dimension of the clamping band 11 at a second step-like portion 25 as more fully disclosed in my prior U.S. Pat. No. 4,299,012. In the stamped-out condition of the flat blank, as shown in FIGS. 1 and 2, the shape of the central pressed-out band portion 22 must be such that in the preassembled condition it assumes the shape as shown in FIG. 17 of this U.S. Pat. No. 4,299,012.

In the clamp structure of this invention, the "Oetiker" ear 16 provides the predetermined clamping action and by plastic deformation thereof, its normal compensation function, for example, for temperature and pressure fluctuations of the medium carried within the hose or for aging of the hose material in which function it is assisted according to this invention by the tolerance-compensating means 30 according to the present invention which is in the form of an undulation generally designated by reference numeral 30. Tolerance compensation is necessary because both the hose-like part of the assembly as well as the nipple or other object onto which the hose-like part is to be fastened are made to dimensions each with a certain tolerance range as specified by the customer. This means in practice that a secure fastening of the hose-like part onto the nipple or other relatively stationery part by means of a clamp structure is possible only if the clamp structure is able to exert the specified pressure at both their minimum and maximum dimensions which occur as both the hose-like part and the nipple or relatively fixed part have, respectively, their minimum dimensions and their maximum dimensions within the given tolerance ranges. As the specifications for clamp structures used, for example, with fuel hoses in automobiles, also require that a minimum holding force be maintained, i.e., that a specified minimum pull-off force of the hose be realized, tests have shown that it is necessary to increase the tolerance-compensating range of clamp structures to be suitable for such applications. Moreover, the ever-higher holding forces specified in the automotive industry require that the hose be so secured onto the nipple as to withstand ever-higher pull-off forces and maintain such higher pull-off forces. Comparing the clamp according to the present invention with a typical Oetiker clamp type 15.7 - 706 R as previously marketed, the effective clamping range of the clamp structure had to be increased to 10 mm. in order to take into consideration the greater specified tolerance range of the nipple and hose assembly which amounts to a minimum diametric dimension of 14.5 mm. and to a maximum diametric dimension of 15.5 mm. According to this invention, the length of the ear, i.e., the internal dimension of the "Oetiker" ear in the longitudinal direction (dimension "d" in FIG. 1) was increased from its pre-existing dimension of 8.5 mm. to 10 mm as a first step. This change of the "Oetiker" ear produces an additional circumferential reduction during tightening of the clamp of about 1.5 mm. or of about 0.5 mm. in relation to the diameter. In addition, a tolerance compensation in the form of the undulation 30 was provided in the clamping band. Furthermore, to withstand a higher specified holding force, the band width of the clamping band was enlarged from 7 mm. to 10 mm., and its thickness was increased from 0.6 mm. to 0.8 mm. A clamp in accordance with the present invention made from stainless steel 1.4301 (AISI 304) having a clamping band width of 10 mm., a clamping band thickness of 0.8 mm., an internal dimension of the "Oetiker" ear of 10 mm., and a tolerance compensation in the form of undulation 30 with one or more punched-out openings as will be described more fully hereinafter, offers a theoretical clamping range of 12.3 mm. to 15.5 mm. in diameter as well as a significant increase in the clamp's holding ability, i.e., in the pull-off force, which can be increased by about 12%.

Further, significant improvements in the pull-off force could be obtained by modifying a conventional nipple with a cylindrical external surface by forming circular grooves in the outer surface thereof. These grooves thereby extend annularly about the circumference of the nipple. Comparing the results obtainable with a nipple without the grooves and one with grooves, the pull-off force with a clamp in accordance with the present invention could be increased from 240N to 520N, i.e., providing more than twice the holding force. Similar improvements were also realized after cyclical testing of the nipple, hose and clamp assembly in accordance with the present invention.

Another important aspect of the present invention resides in the discovery that the tolerance-compensating means 30 of this invention has to be adapted to the particular hose material. Contrary to the disclosure of U.S. Pat. No. 4,919, 682, I have discovered that the oval openings 32a and 32b in the temperature-compensating undulation 30 are particularly appropriate with hoses made from softer material such as rubber. By extending the punched-out openings 32a and 32b longitudinally beyond the undulation 30, a small amount of additional tolerance-compensation may be realized by the three narrow clamping band strips now remaining beyond the openings 32a and 32b, each of narrower dimension than the full clamping band width. In the embodiment of FIGS. 1 and 2, two oval openings 32a and 32b are provided because a single centrally located opening would not be appropriate in the presence of the tongue-like extension 21 which might lead to leakages if the tongue-like extension 21 is pressed or escapes outwardly into such single opening which is of a predetermined minimum width in the transverse direction of the clamping band. This minimum width should be at least as large or larger than the width of any other opening in the clamping band to assure that any elastic stretching of the clamping band material occurs within the area of the remaining narrower clamping band portions of the tolerance-compensating arrangement 30. By extending the oval openings 32a and 32b beyond the undulation 30 itself, a further small amount of tolerance compensation may be realized even after the undulation 30 has been stretched substantially flat by some elastic stretching of the remaining narrower band portions on both sides of and between the two extended lateral openings 32a and 32b.

When harder hose materials are used, such as in plastic hoses, I have discovered that the openings 32a and 32b should be omitted and instead a single opening 38 be provided in the top of the undulation 30. Tests have indicated that a circular opening 38 gives better results than other configurations such as, for example, drop-shaped openings.

The area of the inner clamping band portion 11a which underlies the undulation 30 and oval openings 32a and 32b is provided with two pressed-out embossments 35a and 35b slightly longer and wider than the openings 32a and 32b to assure proper performance of the clamp structure in all of its respects.

In a typical non-limitative example of a clamp structure in accordance with the present invention, which may be varied in its dimensions as required or desired, the overall length a of the punched-out blank in FIG. 1 is 91.5 mm., the thickness of the clamping band b is 0.8 mm., compared to the previous thickness of 0.6 mm., the width c of the clamping band is 10 mm. compared to the prior 7 mm. width, the internal length of the ear d is 10 mm., compared to a length of 8 mm. in the preexisting clamps, the length e of the undulation is 2.5 mm. and the length f of each of the oval openings 32a and 32b is 8 mm. The width of each of the openings 32a and 32b is so chosen that the total width of the two openings 32a and 32b is greater than the width of any other opening in the clamping band, such as the width o of aperture 14. A width g (FIG. 2) of about 2 mm. of each of the openings 32a and 32b has been found to be satisfactory for the clamp of this embodiment. The radius R1 of the undulation 30 is 1.25 mm. while the external radius R2 is 0.4 mm. The overall length h of the tongue-like extension is 13 mm. while the distance i from the abutting surface of the support hook 12 to the end surface of aperture 14 nearer the free end of the outer band portion 11b is 55.2 mm. The distance k from the end of the step-like portions 24a and 24b to the end surface of the aperture 14 nearer the free end of the outer band portion 11b is 30.5 mm. while the distance l from the ends of the oval apertures 32a and 32b nearer the ear 16 to the end surface of the aperture 14 nearer the free end of the outer band portion 11b is 20 mm. The distance m from the center of the ear 16 to the end surface of the aperture 14 nearer the free end of the outer band portion 11b is 11 mm. The length n of the aperture 14 is 3.3 mm. while the width o of the aperture 14 is 3.5 mm. The length p of the opening 15 for the tab-like hook 13 is 3.5 mm. while the spacing q between adjacent end surfaces of aperture 14 and slot 15 is 2 mm. The spacing r between the tip of the abutting surface of support hook 12 and the adjacent end of the tab-like member 13 is 2.3 mm. while the length s of pressed-out embossments 35a and 35b is 9 mm. and their spacing t from the end surface of the inner band portion 11a is 1 mm., i.e., to the transverse surface where the tongue-like extension 21 begins. The full width s' of each pressed-out embossment 35a and 35b is about 3 mm. terminating at both ends in half-circular end portions with a radius of about 1.5 mm. while the distance u from the end of the tongue-like extension to the opposite end of the support hook 12 is 28 mm. The width v of the tongue-like extension 21 is 2.8 mm., and the height w of the pressed-out embossments 35a and 35b from the inner surface of the clamping band to the outer surface of the embossments 35a and 35b is 1.3 mm. The length x of the support hook 12 is 2.8 mm. while its maximum height y is 2.2 mm. The depth z of the reinforcing depression 19 is 2 mm. while the length A of the tab-like member 13 is 3 mm. and its maximum height B is 3.2 mm. The distance D from the end surface of the aperture 14 nearer the free end of the outer band portion 11b to the end of the outer band portion is 8.5 mm. The bridging portion 18 of the ear 16 preferably passes over into the leg portions 17a and 17b by way of rounded-off portions having a relatively small radius of curvature, while the leg portions 17a and 17b pass over into the clamping band 11 by way of rounded-off portions having a relatively small radius of curvature whereby these relatively small radii of curvature may, for example, be about 0.4 mm. The width H of channel 22 is 3 mm.

In a modified embodiment of the clamp structure of FIGS. 1 through 4 for harder hose materials, such as plastic hose materials, the oval openings 32a and 32b are omitted and instead a circular opening 38 is provided in the top area of the undulation 30. With a circular opening having a 4 mm. diameter, and with the ear closed, tests with a clamp otherwise as shown in FIGS. 1 and 2 and under similar conditions have again proved similar satisfactory results for a clamp when used with harder plastic hoses.

Tests concerning the radial forces in dan between the clamp structure according to the present invention and its corresponding prior clamp structure indicate an increase in the radial forces of more than 55% with the clamp structure of this invention.

In order to be able to handle the differences in diametric dimensions for an assembled hose and nipple within a specified tolerance range of a minimum diametric dimension of 14.5 mm. and a maximum diametric dimension of 15.5 mm., the clamp must have an enlarged clamping range of 10 mm. attained by the increased dimension d in the ear 16. The increase of dimension d in ear 16 from 8.5 mm. to 10 mm. permits an additional circumferential reduction during tightening of about 1.5 mm. or, in relation to the diameter, a reduction of about 0.5 mm. To meet present-day specifications, the clamp must therefore be provided additionally with a tolerance compensation. In the clamp structure according to this invention, this is achieved by the inclusion of the undulated tolerance-compensating arrangement 30. With oval, punched-out openings 32a and 32b, a theoretic clamping range of about 12.3 mm. in diameter to about 15.5 mm. in diameter is attainable. Such a clamp structure provides an inner diameter of 13.4 mm with the ear closed. On the other hand, if the tolerance-compensating arrangement 30 does not need to be used, then the clamp Structure according to the present invention, with a closed ear, has an internal diameter of 12.3 mm., i.e., the tolerance-compensating arrangement 30 produces an internal diameter difference of about 1.1 mm. The clamping action or holding force of the ear is not affected by the tolerance-compensating arrangement according to the present invention because the tolerance compensation stretches before the "Oetiker" ear is called upon to provide any significant elastic compensation. In other words, the clamping action of the "Oetiker" ear is not called upon to provide any compensation until the compensation capacity of the compensation means 30 is substantially exhausted, owing to the presence of oval openings 32a, 32b, of the circular opening or of such other means in the undulation 30 as to cause the latter to offer lesser resistance to deformation than the reinforced plastically deformed ear 16. However, the synergistic effect of the combination of an "Oetiker" ear and of the tolerance-compensating means according to this invention in providing an increased return spring action can be seen from the following tabulated test results which demonstrate the increased return spring action of this combination as reflected by the increased distance of the spring return movement. In all of these tests, the samples were made from the same clamping band material having the width and thickness as well as other indicated characteristics and were subjected to the indicated tensional forces in Kp to produce incremental increases in the length (stretching) of the samples in steps of 0.5 mm., also noting the return spring path in mm. when the tensional forces were removed. The ear used in the samples was a typical "Oetiker" ear reinforced by a shallow depression as described above with the typical example. The drop-shaped openings in tests 6A, 6B and 7A, 7B had a substantially semi-circular opening in the area of maximum width and tapered to a pointed minimum width in the direction toward the ears in tests 6A and 7A, with the overall length as specified. The width and thickness of the clamping band material is in mm.

TEST 1A

Band Material: 9 × 0.6
Clamping Band: Undulation With Ear
Undulation: Circular Opening 3.0 mm. Diameter

| Tensional Force Kp | Elongation mm. | Return Spring Path mm. |
| --- | --- | --- |
| 12 | 0.5 | 0.25 |
| 23 | 1.0 | 0.52 |
| 28 | 1.5 | 0.77 |
| 30 | 2.0 | 0.87 |
| 31 | 2.5 | 0.80 |
| 33 | 3.0 | 0.95 |
| 33 | 3.5 | 1.03 |
| 34 | 4.0 | 0.92 |
| 34 | 4.5 | 1.08 |
| 34 | 5.0 | 1.17 |

TEST 1B

Band Material: 9 × 0.6
Clamping Band: Undulation Without Ear
Undulation: Circular Opening 3.0 mm. Diameter

| Tensional Force Kp | Elongation mm. | Return Spring Path mm. |
| --- | --- | --- |
| 43 | 0.5 | 0.14 |
| 85 | 1.0 | 0.17 |
| 90 | 1.5 | 0.19 |
| 130 | 2.0 | 0.23 |
| 205 | 2.5 | 0.27 |

TEST 2A

Band Material: 10 × 0.6
Clamping Band: Undulation With Ear
Undulation: Circular Opening 3.0 mm. Diameter

| Tensional Force Kp | Elongation mm. | Return Spring Path mm. |
| --- | --- | --- |
| 18 | 0.5 | 0.22 |
| 26 | 1.0 | 0.45 |
| 29 | 1.5 | 0.43 |
| 31 | 2.0 | 0.57 |
| 32 | 2.5 | 0.78 |

TEST 2A-continued

Band Material: 10 × 0.6
Clamping Band: Undulation With Ear
Undulation: Circular Opening 3.0 mm. Diameter

| Tensional Force Kp | Elongation mm. | Return Spring Path mm. |
|---|---|---|
| 34 | 3.0 | 0.77 |
| 35 | 3.5 | 0.67 |
| 35 | 4.0 | 0.85 |
| 35 | 4.5 | 0.79 |
| 36 | 5.0 | 0.82 |

TEST 2B

Band Material: 10 × 0.6
Clamping Band: Undulation Without Ear
Undulation: Circular Opening 3.0 mm. Diameter

| Tensional Force Kp | Elongation mm. | Return Spring Path mm. |
|---|---|---|
| 33 | 0.5 | 0.24 |
| 52 | 1.0 | 0.25 |
| 73 | 1.5 | 0.26 |
| 109 | 2.0 | 0.25 |
| 175 | 2.5 | 0.25 |

TEST 3A

Band Material: 9 × 0.6
Clamping Band: Undulation With Ear
Undulation: Circular Opening 3.5 mm. Diameter

| Tensional Force Kp | Elongation mm. | Return Spring Path mm. |
|---|---|---|
| 15 | 0.5 | 0.19 |
| 22 | 1.0 | 0.47 |
| 28 | 1.5 | 0.63 |
| 31 | 2.0 | 0.67 |
| 33 | 2.5 | 0.93 |
| 34 | 3.0 | 0.94 |
| 35 | 3.5 | 0.90 |
| 35 | 4.0 | 1.02 |
| 36 | 4.5 | 1.13 |
| 36 | 5.0 | 0.98 |

TEST 3B

Band Material: 9 × 0.6
Clamping Band: Undulation Without Ear
Undulation: Circular Opening 3.5 mm. Diameter

| Tensional Force Kp | Elongation mm. | Return Spring Path mm. |
|---|---|---|
| 45 | 0.5 | 0.17 |
| 63 | 1.0 | 0.23 |
| 85 | 1.5 | 0.23 |
| 135 | 2.0 | 0.23 |
| 200 | 2.5 | 0.32 |

TEST 4A

Band Material: 10 × 0.6
Clamping Band: Undulation With Ear
Undulation: Circular Opening 3.5 mm. Diameter

| Tensional Force Kp | Elongation mm. | Return Spring Path mm. |
|---|---|---|
| 15 | 0.5 | 0.29 |
| 24 | 1.0 | 0.44 |
| 28 | 1.5 | 0.69 |
| 30 | 2.0 | 0.83 |
| 33 | 2.5 | 0.79 |
| 34 | 3.0 | 0.88 |
| 35 | 3.5 | 1.02 |
| 35 | 4.0 | 1.05 |

TEST 4A-continued

Band Material: 10 × 0.6
Clamping Band: Undulation With Ear
Undulation: Circular Opening 3.5 mm. Diameter

| Tensional Force Kp | Elongation mm. | Return Spring Path mm. |
|---|---|---|
| 36 | 4.5 | 1.05 |
| 37 | 5.0 | 1.20 |

TEST 4B

Band Material: 10 × 0.6
Clamping Band: Undulation Without Ear
Undulation: Circular Opening 3.5 mm. Diameter

| Tensional Force Kp | Elongation mm. | Return Spring Path mm. |
|---|---|---|
| 40 | 0.5 | 0.16 |
| 52 | 1.0 | 0.19 |
| 80 | 1.5 | 0.14 |
| 130 | 2.0 | 0.20 |
| 185 | 2.5 | 0.24 |

TEST 5A

Band Material: 9 × 0.6
Clamping Band: Undulation With Ear
Undulation: Circular Opening 4.0 mm. Diameter

| Tensional Force Kp | Elongation mm. | Return Spring Path mm. |
|---|---|---|
| 15 | 0.5 | 0.50 |
| 15 | 1.0 | 1.00 |
| 18 | 1.5 | 1.36 |
| 25 | 2.0 | 1.69 |
| 30 | 2.5 | 1.88 |
| 32 | 3.0 | 2.10 |
| 34 | 3.5 | 2.28 |
| 35 | 4.0 | 2.20 |
| 35 | 4.5 | 2.18 |
| 35 | 5.0 | 2.25 |

TEST 5B

Band Material: 9 × 0.6
Clamping Band: Undulation Without Ear
Undulation: Circular Opening 4.0 mm. Diameter

| Tensional Force Kp | Elongation mm. | Return Spring Path mm. |
|---|---|---|
| 40 | 0.5 | 0.30 |
| 55 | 1.0 | 0.38 |
| 78 | 1.5 | 0.39 |
| 125 | 2.0 | 0.33 |
| 175 | 2.5 | 0.42 |

TEST 6A

Band Material: 9 × 0.6
Clamping Band: Undulation With Ear
Undulation: Drop-Shaped Opening Having A 3.5 mm. Diameter and 7 mm. Length

| Tensional Force Kp | Elongation mm. | Return Spring Path mm. |
|---|---|---|
| 20 | 0.5 | 0.30 |
| 25 | 1.0 | 0.59 |
| 28 | 1.5 | 0.96 |
| 30 | 2.0 | 0.87 |
| 33 | 2.5 | 1.01 |
| 35 | 3.0 | 1.18 |
| 38 | 3.5 | 0.99 |
| 38 | 4.0 | 1.03 |
| 38 | 4.5 | 1.23 |
| 38 | 5.0 | 1.06 |

TEST 6B

Band Material: 9 × 0.6
Clamping Band: Undulation Without Ear
Undulation: Drop-Shaped Opening Having A
3.5 mm. Diameter and 7 mm. Length

| Tensional Force Kp | Elongation mm. | Return Spring Path mm. |
|---|---|---|
| 43 | 0.5 | 0.36 |
| 59 | 1.0 | 0.40 |
| 80 | 1.5 | 0.34 |
| 122 | 2.0 | 0.25 |
| 185 | 2.5 | 0.32 |

TEST 7A

Band Material: 10 × 0.6
Clamping Band: Undulation With Ear
Undulation: Drop-Shaped Opening Having A
3.5 mm. Diameter and 7 mm. Length

| Tensional Force Kp | Elongation mm. | Return Spring Path mm. |
|---|---|---|
| 22 | 0.5 | 0.44 |
| 30 | 1.0 | 0.64 |
| 35 | 1.5 | 0.72 |
| 38 | 2.0 | 0.81 |
| 39 | 2.5 | 0.99 |
| 40 | 3.0 | 1.03 |
| 40 | 3.5 | 1.00 |
| 40 | 4.0 | 1.10 |
| 40 | 4.5 | 1.16 |
| 40 | 5.0 | 1.11 |

TEST 7B

Band Material: 10 × 0.6
Clamping Band: Undulation Without Ear
Undulation: Drop-Shaped Opening Having A
3.5 mm. Diameter and 7 mm. Length

| Tensional Force Kp | Elongation mm. | Return Spring Path mm. |
|---|---|---|
| 30 | 0.5 | 0.29 |
| 50 | 1.0 | 0.28 |
| 70 | 1.5 | 0.22 |
| 105 | 2.0 | 0.24 |
| 165 | 2.5 | 0.25 |

TEST 7C

Band Material: 10 × 0.6
Clamping Band: Undulation With Ear
Undulation: Circular Opening 4.0 mm. Diameter

| Tensional Force Kp | Elongation mm. | Return Spring Path mm. |
|---|---|---|
| 18 | 0.5 | 0.28 |
| 25 | 1.0 | 0.51 |
| 28 | 1.5 | 0.80 |
| 30 | 2.0 | 0.89 |
| 32 | 2.5 | 0.75 |
| 33 | 3.0 | 0.98 |
| 33 | 3.5 | 1.01 |
| 33 | 4.0 | 0.93 |
| 33 | 4.5 | 0.96 |
| 33 | 5.0 | 1.06 |

TEST 8A

Band Material: 9 × 0.6
Clamping Band: Undulation With Ear
Undulation: Slot 10 mm. in Length and 2 mm. in Width

| Tensional Force Kp | Elongation mm. | Return Spring Path mm. |
|---|---|---|
| 15 | 0.5 | 0.35 |
| 25 | 1.0 | 0.60 |

TEST 8A-continued

Band Material: 9 × 0.6
Clamping Band: Undulation With Ear
Undulation: Slot 10 mm. in Length and 2 mm. in Width

| Tensional Force Kp | Elongation mm. | Return Spring Path mm. |
|---|---|---|
| 25 | 1.5 | 0.75 |
| 30 | 2.0 | 0.77 |
| 30 | 2.5 | 1.00 |
| 30 | 3.0 | 1.08 |
| 32 | 3.5 | 1.10 |
| 32 | 4.0 | 1.11 |
| 32 | 4.5 | 1.19 |
| 32 | 5.0 | 1.31 |
| 33 | 6.0 | 1.31 |
| 33 | 7.0 | 1.29 |
| 35 | 8.0 | 1.42 |

TEST 8B

Band Material: 9 × 0.6
Clamping Band: Undulation Without Ear
Undulation: Slot 10 mm. in Length and 2 mm. in Width

| Tensional Force Kp | Elongation mm. | Return Spring Path mm. |
|---|---|---|
| 35 | 0.5 | 0.23 |
| 52 | 1.0 | 0.27 |
| 75 | 1.5 | 0.24 |
| 110 | 2.0 | 0.28 |
| 175 | 2.5 | 0.30 |

TEST 9A

Band Material: 10 × 0.6
Clamping Band: Undulation With Ear
Undulation: Slot 10 mm. in Length and 2 mm. in Width

| Tensional Force Kp | Elongation mm. | Return Spring Path mm. |
|---|---|---|
| 20 | 0.5 | 0.49 |
| 28 | 1.0 | 0.69 |
| 32 | 1.5 | 0.87 |
| 33 | 2.0 | 0.97 |
| 35 | 2.5 | 1.00 |
| 35 | 3.0 | 1.09 |
| 35 | 3.5 | 1.17 |
| 36 | 4.0 | 1.12 |
| 35 | 4.5 | 1.21 |
| 35 | 5.0 | 1.31 |
| 37 | 6.0 | 1.32 |
| 38 | 7.0 | 1.44 |
| 38 | 8.0 | 1.45 |

TEST 9B

Band Material: 10 × 0.6
Clamping Band: Undulation Without Ear
Undulation: Slot 10 mm. in Length and 2 mm. in Width

| Tensional Force Kp | Elongation mm. | Return Spring Path mm. |
|---|---|---|
| 38 | 0.5 | 0.22 |
| 55 | 1.0 | 0.31 |
| 75 | 1.5 | 0.30 |
| 120 | 2.0 | 0.24 |
| 175 | 2.5 | 0.29 |

Though I have described only two embodiments in accordance with the present invention, it is understood that the same is not limited thereto but is susceptible of numerous modifications as known to a person skilled in the art. Thus, the present invention is also applicable to other clamp structures as long as a separate tolerance-compensating arrangement is maintained in conjunction with a tightening arrangement providing the required clamping range and clamping action. For example, the size of the one-ear clamp structure and its dimensions can be varied to provide clamp structures for different hose diameters. Furthermore, dimensions may be varied to meet particular needs and specifications of a customer and/or to meet the requirements of different mechanical connections in the overlapping band portions. For example, the number of hooks and/or the types of hooks may be varied depending on size and requirements of the particular clamp structure. Furthermore, the present invention is also applicable to clamp structures having more than one ear and/or assembled of two or more components. The means for tightening the clamp may also be changed as long as it provides a spring action offering a clamping range with a clamping force meeting the specified requirements. The same is true for the thickness and width of the clamping band and of the tolerance-compensating arrangement which can be varied as long as the specified requirements are met in a manner consistent with this invention. The means to assure an internal clamping surface devoid of any step, offset or discontinuity may also be modified, for example, as disclosed in my prior U.S. Pat. No. 4,315,348 or in my prior U.S. Pat. No. 4,237,584 or as shown in FIGS. 6–11 of my prior U.S. Pat. No. 5,283,931. Thus, the present invention is not limited to the particular embodiments and their dimensions described herein but is applicable to other modified clamp structures which involve similar problems and which meet the criteria as disclosed with the present invention. I therefore do not wish to be limited to the details shown and described herein but intend to cover all such changes and modifications as are encompassed by the scope of the appended claims.

I claim:

1. A clamp structure, comprising clamping band means, means in said clamping band means to enable installing of the clamp structure on an object to be fastened thereby including means for tightening the clamp structure about the object to be fastened and providing both a clamping force as well as a tolerance compensation, and further tolerance-compensating means including undulation means in said clamping band means to increase the return spring action.

2. A clamp structure according to claim 1, wherein said further tolerance-compensation means includes at least one opening means in said undulation means of such preselected shape as to take into consideration the hardness of the hose material.

3. A clamp structure according to claim 2, wherein a respective opening means extends at least over substantially the entire length of a respective undulation means, as viewed in the longitudinal direction of the clamping band means.

4. A clamp structure according to claim 3, wherein a respective opening means extends in the clamping band longitudinal direction beyond at least one end of a respective undulation means.

5. A clamp structure according to claim 4, wherein the length of a respective opening means in the longitudinal direction of the clamping band means is at least twice the length of the gap formed underneath a respective undulation means.

6. A clamp structure according to claim 4, wherein a respective opening means extends in the clamping band longitudinal direction beyond both ends of a respective undulation means.

7. A clamp structure according to claim 6, wherein a respective opening means has a substantially oval shape.

8. A clamp structure according to claim 7, wherein a respective opening means of substantially oval shape has a substantially rectilinear main portion terminating in at least approximately semi-circular end portions.

9. A clamp structure according to claim 2, wherein a respective opening means in the undulation means is so located in the clamping band means as to leave lateral undulation portions along the sides of the opening means.

10. A clamp structure according to claim 2, wherein the opening means has an at least approximately circular shape and is located in the top portion of the corresponding undulation means.

11. A clamp structure according to claim 2, wherein a respective opening means has an at least approximately drop-shaped configuration.

12. A clamp structure according to claim 2 wherein at least two opening means are provided in a respective undulation means which are spaced from each other in the clamping band transverse direction in such a manner that three undulation portions are formed consisting of two lateral undulation portions and of a central undulation portion.

13. A clamp structure according to claim 12, wherein each opening means has a substantially oval shape.

14. A clamp structure according to claim 2, further comprising additional means to assure a substantially smooth internal clamping surface including tongue-like means at one of the inner and outer band portions and tongue-receiving means in the other of the inner and outer band portions.

15. A clamp structure according to claim 14, wherein said tongue-receiving means is formed in part by a step-like area in the outer band portion.

16. A clamp structure according to claim 15, wherein the length of the opening means in the clamping band longitudinal direction is at least three to four times the length of the gap.

17. A clamp structure according to claim 2, wherein the length of the gap formed underneath a respective undulation means is about two to three times the thickness of the clamping band means.

18. A clamp structure according to claim 2, wherein the height of a respective undulation means is greater than about twice the thickness of the clamping band means but less than about four times the thickness of the clamping band means.

19. A clamp structure according to claim 2, wherein a respective undulation means is rounded off convexly in its outer part by a radius which corresponds at least to the thickness of the clamping band means.

20. A clamp structure according to claim 19, wherein said radius is about one to about two times the thickness of the clamping band means.

21. A clamp structure according to claim 2, wherein said clamping band means includes two pressed-out embossments within an area underlying the opening means when the clamp is preassembled, and the area of each embossments means being at least equal to and coextensive with the area of said opening means.

22. A clamp structure according to claim 1, wherein said tightening means includes at least one ear-like means having two generally outwardly extending leg portions interconnected by a bridging portion provided with reinforcing means.

23. A clamp structure according to claim 22, wherein said reinforcing means is formed by at least one shallow depression means covering an area of at least about 30% of the total area of the bridging portion prior to the formation of the reinforcing means.

24. A clamp structure according to claim 22, wherein said reinforcing means is formed by two substantially longitudinally extending depression means disposed side-by-side in the bridging portion whose total area covers said at least about 30% of the total area of the bridging portion.

25. A clamp structure according to claim 1 for installing and fastening a hose on a nipple, wherein said nipple is provided with groove means within an area in the outer surface of the nipple in which the clamp structure is mounted over the hose.

26. The combination according to claim 25, wherein said groove means extend annularly about the circumference of the nipple.

27. The combination according to claim 26, wherein said groove means are substantially circular in shape.

28. A clamp structure, comprising clamping band means, further means in said clamping band means to enable installing of the clamp structure on an object to be fastened thereby including means providing a spring action for tightening the clamp structure about the object to be fastened as well as tolerance-compensation, said tightening means being operable upon tightening thereof to provide and maintain predetermined clamping forces exerted by said clamp structure on said object, and tolerance-compensating means in said clamping band means operable to leave substantially unaffected the clamping forces of said tightening means over at least nearly the entire range of tolerance compensation of said tolerance-compensation means while at the same time producing in combination with the tightening means an increased spring return movement.

29. A clamp structure according to claim 28, wherein said tightening means is a plastically deformable ear means including generally outwardly extending leg portions interconnected by a bridging portion extending in the longitudinal direction of the clamping band means and provided with reinforcing means.

30. A clamp structure according to claim 29, wherein said tightening means includes at least one ear-like means having two generally outwardly extending leg portions interconnected by a bridging portion extending in the longitudinal direction and provided with reinforcing means, and wherein said reinforcing means is formed by at least one shallow depression means covering an area of at least about 30% of the total area of the bridging portion prior to the formation of the reinforcing means.

31. A clamp structure according to claim 30, wherein said reinforcing means is formed by two substantially longitudinally extending depression means disposed side-by-side in the bridging portion whose total area covers said at least about 30% of the total area of the bridging portion.

32. A clamp structure according to claim 28, wherein said tolerance-compensating means includes further means in the form of at least one opening means adapted to the hardness of the hose material.

33. A clamp structure according to claim 32, wherein said opening means is of a size, location and shape to adapt the tolerance-compensating means to the hardness of the hose material.

34. A clamp structure according to claim 32, wherein said tolerance-compensating means includes undulation means with said opening means extending in said undulation means.

35. A clamp structure according to claim 32, wherein said clamp structure is of the open type having overlapping band portions and wherein said further means enabling installing of the clamp structure includes mechanical connecting means having at least one aperture means in one of the band portions, and wherein the width of the opening means in the clamping transverse direction is at least as large as the width of the aperture means in the clamping band transverse direction.

36. A clamp structure according to claim 35, wherein said mechanical connecting means includes at least one generally outwardly projecting hook-like means in the other band portion operable to engage in the aperture means of the one band portion to mechanically connect with each other the overlapping band portions.

37. A clamp structure according to claim 36, wherein said hook-like means includes at least one deep-drawn, cold-deformed outwardly extending support hook pressed out of the clamping band means along a substantially transversely extending cut to provide an abutment surface, and said aperture means is of generally rectangular shape with a width sufficient to allow the support hook to extend therethrough and engage with its abutment surface one of the transversely extending edges thereof.

38. A clamp structure according to claim 37, wherein said hook-like means further include a tab-like hook extending substantially in the clamping band longitudinal direction and bent out of the clamping band means about an axis also extending substantially in the clamping band longitudinal direction, and wherein said aperture means is a slot-like aperture extending substantially in the clamping band longitudinal direction and having a width at least slightly greater than the thickness of the clamping band means.

39. A clamp structure according to claim 38, wherein said tab-like hook has such a height dimension as to enable preassembly of the clamp structure by bending over its outwardly projecting end portion.

40. A nipple for use with a clamp structure according to claim 28, wherein said nipple includes a substantially cylindrical external surface provided with annular groove means.

41. A nipple according to claim 26, wherein said groove means are of substantially circular shape.

42. A clamp structure according to claim 28, wherein said clamp structure is of the open type having overlapping band portions, and wherein said further means enabling installing of the clamp structure includes connecting means mechanically connecting overlapping band portions with means for preassembling the clamp structure.

43. A clamp structure according to claim 42, wherein means for preassembling said clamp structure includes a tab-like hook in the inner band portion extending substantially in the longitudinal direction and bent out of the clamping band means about an axis also extending substantially in the clamping band longitudinal direction, and an aperture means in the outer band portion, said tab-like hook having such a height as to be able to be bent over with its outwardly projecting end portions to attain preassembly.

44. A clamp structure according to claim 43, wherein said aperture means is substantially U-shaped.

45. A clamp structure, comprising clamping band means and deformable ear means for tightening the clamp structure about an object to be fastened thereby, said deformable ear means providing a predetermined clamping force and tolerance-compensation, and further means in said clamp structure to increase the tolerance compensation of the clamp structure while at the same time increasing the return spring path thereof under tensional forces in the clamping band means.

46. A clamp structure according to claim 45, wherein said further means includes undulation means.

47. A clamp structure according to claim 46, further comprising means providing an internal clamping surface devoid of a step at the end of the inner band portion including a tongue-like part and a tongue-receiving means for said tongue-like part in the area of overlapping band portions.

48. A clamp structure according to claim 47, wherein said undulation means includes additional means to offset its spring characteristics in dependence on the hardness of the material of the object to be fastened.

49. A clamp structure according to claim 48, wherein said additional means are of such shape as to prevent bulging out of the tongue-like part.

50. A clamp structure according to claim 46, wherein said undulation means includes additional means to offset its spring characteristics in dependence on the hardness of the material of the object to be fastened.

* * * * *